United States Patent
Forster et al.

(10) Patent No.: US 11,120,323 B2
(45) Date of Patent: Sep. 14, 2021

(54) METHOD OF USING SHIELDED RFID STRAPS WITH RFID TAG DESIGNS

(71) Applicant: Avery Dennison Retail Information Services, LLC, Mentor, OH (US)

(72) Inventors: Ian J. Forster, Chelmsford (GB); Norman A. Howard, Ilford (GB); Edward J. McGinniss, Clinton, SC (US)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 16/389,274

(22) Filed: Apr. 19, 2019

(65) Prior Publication Data

US 2019/0325285 A1 Oct. 24, 2019

Related U.S. Application Data

(60) Provisional application No. 62/660,498, filed on Apr. 20, 2018.

(51) Int. Cl.
*G06K 19/077* (2006.01)

(52) U.S. Cl.
CPC . *G06K 19/07788* (2013.01); *G06K 19/07718* (2013.01)

(58) Field of Classification Search
CPC ............. G06K 7/00; G06K 7/08; G06K 7/081
USPC .................................. 235/451, 439, 435, 375
See application file for complete search history.

(56) References Cited

U.S. PATENT DOCUMENTS

| | | |
|---|---|---|
| D383,465 S | 9/1997 | Chen |
| 6,142,381 A | 11/2000 | Finn et al. |
| 7,214,569 B2 * | 5/2007 | Swindlehurst ....... G06K 19/077 257/E23.064 |
| D546,819 S | 7/2007 | Oliver |
| D553,124 S | 10/2007 | Joughin et al. |
| 7,471,173 B2 | 12/2008 | Hidaka et al. |
| 7,500,610 B1 | 3/2009 | Hadley et al. |

(Continued)

FOREIGN PATENT DOCUMENTS

| | | |
|---|---|---|
| CN | 109389203 | 2/2019 |
| EP | 1174667 | 1/2002 |

(Continued)

OTHER PUBLICATIONS

International Search Report and Written Opinion dated Sep. 10, 2019 issued in corresponding IA No. PCT/US2019/028268 filed Apr. 19, 2019.

(Continued)

*Primary Examiner* — Edwyn Labaze

(57) ABSTRACT

A method of using shielded straps with RFID tag designs is disclosed. Specifically, the RFID device, in one embodiment, comprises a bridge conductor which couples the antenna and pair of strap pads together. Thus, the coupling between the bridge conductor and the strap conductor, the coupling between the bridge conductor and the antenna conductor, and the coupling between the antenna conductor and the strap conductor increases the total capacitance of the RFID strap device. Further, the presence of the bridge conductor also reduces the area occupied for a given inductance, and provides a higher effective capacitance when the bridge strap is connected to the antenna.

19 Claims, 8 Drawing Sheets

(56) References Cited

U.S. PATENT DOCUMENTS

| | | | |
|---|---|---|---|
| 7,535,366 | B2 | 5/2009 | Egbert et al. |
| D634,738 | S | 3/2011 | Lim et al. |
| 8,473,235 | B2 | 6/2013 | Kittel et al. |
| 8,511,569 | B1* | 8/2013 | Koepp .............. G06K 19/07752 235/492 |
| D697,900 | S | 1/2014 | Yang et al. |
| D716,774 | S | 11/2014 | Forster et al. |
| 9,070,563 | B2 | 6/2015 | Yamazaki et al. |
| 9,418,262 | B1 | 3/2016 | Gentile et al. |
| D809,489 | S | 2/2018 | Burkholder et al. |
| D812,045 | S | 3/2018 | Howard |
| D826,220 | S | 8/2018 | He |
| D837,769 | S | 1/2019 | Yang |
| 10,186,765 | B2 | 1/2019 | Coleman et al. |
| 10,243,255 | B2 | 3/2019 | Rokhsaz et al. |
| 10,268,945 | B1 | 4/2019 | Keller et al. |
| 10,311,355 | B1 | 6/2019 | Hahn et al. |
| D855,039 | S | 7/2019 | Naweed |
| D880,460 | S | 4/2020 | Forster |
| 2002/0157411 | A1 | 10/2002 | Ishikawa et al. |
| 2004/0089707 | A1 | 5/2004 | de Cortina et al. |
| 2005/0001785 | A1* | 1/2005 | Ferguson ......... G06K 19/07752 343/895 |
| 2005/0091996 | A1 | 5/2005 | Ishikawa et al. |
| 2006/0043198 | A1 | 3/2006 | Forster |
| 2006/0044192 | A1 | 3/2006 | Egbert |
| 2006/0054710 | A1 | 3/2006 | Forster et al. |
| 2006/0145872 | A1 | 7/2006 | Tanaka et al. |
| 2007/0063057 | A1 | 3/2007 | Masubuchi et al. |
| 2007/0069859 | A1 | 3/2007 | Bae et al. |
| 2007/0132593 | A1 | 6/2007 | Yamazaki |
| 2007/0171129 | A1 | 7/2007 | Coleman et al. |
| 2007/0194935 | A1 | 8/2007 | Ayala et al. |
| 2007/0238245 | A1 | 10/2007 | Cote et al. |
| 2008/0105673 | A1 | 5/2008 | Ikeda et al. |
| 2008/0143480 | A1 | 6/2008 | Egbert et al. |
| 2008/0220721 | A1 | 9/2008 | Downie et al. |
| 2009/0109002 | A1* | 4/2009 | Hadley ............ G06K 19/07718 340/10.1 |
| 2009/0179817 | A1 | 7/2009 | Yin |
| 2009/0236334 | A1 | 9/2009 | Ben-Shmuel et al. |
| 2009/0309703 | A1 | 12/2009 | Forster |
| 2010/0000980 | A1 | 1/2010 | Popescu |
| 2010/0117819 | A1 | 5/2010 | Murray |
| 2010/0141452 | A1 | 6/2010 | Lian et al. |
| 2010/0213187 | A1 | 8/2010 | Bandholz et al. |
| 2011/0133904 | A1 | 6/2011 | Warther |
| 2011/0147467 | A1 | 6/2011 | Choi |
| 2012/0061473 | A1 | 3/2012 | Forster et al. |
| 2012/0062367 | A1 | 3/2012 | Warther |
| 2012/0111950 | A1 | 5/2012 | Worrall et al. |
| 2013/0002404 | A1 | 1/2013 | Takeoka et al. |
| 2013/0087625 | A1 | 4/2013 | Kato |
| 2013/0306626 | A1 | 11/2013 | Torres et al. |
| 2014/0034739 | A1 | 2/2014 | Forster et al. |
| 2015/0076238 | A1 | 3/2015 | Koskelainen |
| 2015/0144702 | A1 | 5/2015 | Mei et al. |
| 2016/0003895 | A1* | 1/2016 | Farr .................. G01R 31/2822 324/754.03 |
| 2017/0214142 | A1 | 8/2017 | Rokhsaz et al. |
| 2018/0092486 | A1 | 4/2018 | Kwon et al. |
| 2018/0189623 | A1 | 7/2018 | Forster et al. |
| 2019/0325282 | A1 | 10/2019 | Forster et al. |
| 2020/0005110 | A1 | 1/2020 | Forster |
| 2020/0160005 | A1 | 5/2020 | Volpi et al. |

FOREIGN PATENT DOCUMENTS

| | | |
|---|---|---|
| EP | 1479619 | 11/2004 |
| EP | 2306588 | 4/2011 |
| GB | 2554952 | 4/2018 |
| JP | 2001-317741 | 11/2001 |
| JP | 2003-087044 | 3/2003 |
| JP | 2005-252853 | 9/2005 |
| JP | 2006-132793 | 5/2006 |
| JP | 2007-086863 | 4/2007 |
| JP | 2007-089054 | 4/2007 |
| JP | 2010-045467 | 2/2010 |
| WO | 2002/099764 | 12/2002 |
| WO | 2006/048964 | 11/2006 |
| WO | 2008/084917 | 7/2008 |
| WO | 2011/159716 | 12/2011 |
| WO | 2014/210000 | 12/2014 |
| WO | 2017/094794 | 6/2017 |
| WO | 2018/125977 | 7/2018 |

OTHER PUBLICATIONS

International Preliminary Report on Patentability dated Oct. 29, 2020 issued in corresponding IA No. PCT/US2019/028268 filed Apr. 19, 2019.

International Search Report and Written Opinion dated Oct. 1, 2019 issued in corresponding IA No. PCT/US2019/039485 filed Jun. 27, 2019.

International Preliminary Report on Patentability dated Oct. 20, 2020 issued in corresponding IA No. PCT/US2019/028281 filed Apr. 19, 2019.

International Search Report and Written Opinion dated Aug. 5, 2019 issued in corresponding IA No. PCT/US2019/028281 filed Apr. 19, 2019.

International Preliminary Report on Patentability dated Jul. 11, 2019 issued in corresponding IA No. PCT/US2017/068659 filed Dec. 28, 2017.

International Search Report and Written Opinion dated Oct. 11, 2019 issued in corresponding IA No. PCT/US2019/039460 filed Jun. 27, 2019.

International Search Report and Written Opinion dated Jun. 8, 2018 issued in corresponding IA No. PCT/US2017/068659 filed Dec. 28, 2017.

International Preliminary Report on Patentability dated Oct. 29, 2020 issued in corresponding IA No. PCT/US2019/028275 filed Apr. 19, 2019.

International Search Report and Written Opinion dated Jul. 12, 2019 issued in corresponding IA No. PCT/US2019/028275 filed Apr. 19, 2019.

International Search Report and Written Opinion dated Mar. 31, 2021 issued in corresponding IA No. PCT/US2020/067168 filed Dec. 28, 2020.

International Search Report and Written Opinion dated Mar. 30, 2021 issued in corresponding IA No. PCT/US2020/067115 filed Dec. 28, 2020.

International Preliminary Report on Patentability dated Dec. 29, 2020 issued in corresponding IA No. PCT/US2019/039485 filed Jun. 27, 2019.

International Preliminary Report on Patentability dated Dec. 29, 2020 issued in corresponding IA No. PCT/US2019/039460 filed Jun. 27, 2019.

* cited by examiner

METHOD OF USING SHIELDED RFID STRAPS WITH RFID TAG DESIGNS

CROSS REFERENCE TO RELATED APPLICATION(S)

The present application claims priority to and the benefit of U.S. provisional utility patent application No. 62/660,498 filed Apr. 20, 2018, which is incorporated herein by reference in its entirety.

BACKGROUND

The present invention relates generally to a method of using shielded radio-frequency identification ("RFID") straps with RFID tag designs and the resulting apparatus. Specifically, the method allows for adding capacitance across the capacitance of the attached RFID strap to reduce the amount of inductance needed to resonate at the desired frequency. The present method is especially suitable for RFID strap devices. Accordingly, the present specification makes specific reference thereto. However, it is to be appreciated that aspects of the present inventive method are also equally amenable to other like applications and devices.

RFID uses magnetic, electric, or electromagnetic fields transmitted by a reader system to identify itself and, in some instances, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency ("RF") interrogation signal received from a reader, also referred to as an interrogator. In the case of passive RFID devices, the energy of the interrogation signal may also provide the necessary energy to operate the RFID device.

RFID tags are generally formed by connecting an RFID chip to some form of antenna. Antenna types are very diverse, as are the methods used to construct the same. One construction method of making RFID tags is to use a strap, which is a relatively small device with an RFID chip connected to two or more conductors that can be coupled to an antenna. Said coupling can be achieved using a conductive connection, an electric field connection, magnetic connection or a combination of coupling methods. Another method known in the art is direct chip attachment in which the chip is directly attached to the antenna without the utilization of any sort of strap or other device to aid in the connection of the chip to the antenna.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags may be manufactured with a unique identification number which is typically a simple serial number of a few bytes with a check digit attached. This identification number is incorporated into the tag during manufacture. The user cannot alter this serial/identification number and manufacturers guarantee that each serial number is used only once. Such read-only RFID tags typically are permanently attached to an article to be tracked and, once attached, the serial number of the tag is associated with its host article in a computer data base.

A number of RFID antenna types require a resonant element as part of the overall structure. The resonant element is typically the combination of an inductor formed as part of the antenna and the capacitance of the RFID chip, and is capable of performing a number of different functions. For example, the resonant element may be part of a network matching the impedance of the chip and antenna for optimum power transfer, or coupling magnetically to a reader system at or near the resonant frequency.

Unfortunately, a current limitation of present day RFID tag designs is achieving the desired resonance inside a relatively small area. The chip capacitance must be combined with an inductor according to the known resonant frequency formula: $F_{res}=1/(2\pi SQRT(LC))$, where L is the induction in henrys and is related to the length of wire or flat strip of conductor and its diameter/width, F equals the frequency in hertz and C is the capacitance in farads.

To achieve a given inductance, a certain amount of length and width must be accommodated as part of the RFID antenna to resonate the chip capacitance. Making a line narrow requires tighter manufacturing tolerances and increased resistance, which increases the amount of energy loss in the structure and, therefore, reduces the efficiency of the RFID tag and its operational range. In RFID antennas it is common to fold-up the inductor to fit inside an area in which the two ends are connected to the RFID strap/chip.

Consequently, it would be advantageous to have a method of adding capacitance across the capacitance of the attached RFID strap to reduce the amount of inductance needed to resonate at the desired frequency. The present invention discloses a method of adding said capacitance by using shielded straps with RFID tag designs. Specifically, the RFID strap device comprises a bridge conductor which couples the antenna and pair of strap pads together. This coupling between conductors increases the total capacitance of the RFID strap device. Further, the presence of the bridge conductor also reduces the area occupied for a given inductance, and provides a higher effective capacitance when the bridge strap is connected to the antenna.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a method of increasing capacitance by incorporating a second bridge conductor into an RFID strap device. More specifically, the RFID strap device comprises a bridge (or second) conductor coupled to a strap (or first) conductor via a separating dielectric. The RFID strap device is also coupled to a separate antenna conductor on a base substrate. The antenna can be made of aluminum foil, and the base substrate is typically a paper. Further, the second bridge conductor, the first strap conductor, and the antenna conductor overlap each other to provide a mutual area with separating dielectrics, and creating a plurality of capacitors.

In another embodiment, the area of the bridge conductor is modified via a cutting process to alter the bridging capacitance. For example, if the area of the bridge conductor is larger than the area of the pair of strap pads, high bridging capacitance is provided. If the area of the bridge conductor is smaller than the area of the pair of strap pads, low bridging capacitance is provided.

According to some embodiments of the present disclosure, a radio-frequency identification (RFID) device comprises a first conductor comprised of at least one pair of strap pads and an RFID chip connected to the at least one pair of strap pads, a second conductor, and a dielectric positioned between the first conductor and the second conductor, wherein the first strap conductor couples to an antenna conductor.

In some embodiments, the at least one pair of strap pads is coupled to the antenna conductor via a conductive adhesive. In other embodiments, the at least one pair of strap pads is coupled to the antenna conductor via capacitance. In some embodiments, the antenna conductor is attached to a base substrate.

In some embodiments, the second conductor is a bridge. In some embodiments, the second conductor, the first strap conductor, and the antenna conductor overlap each other to provide a mutual area with separating dielectrics and a plurality of capacitors having a value. In further embodiments, the value of the plurality of capacitors is determined by (i) the mutual area, (ii) a dielectric constant of a material between the antenna conductor, the first strap conductor and the second conductor, and (iii) an amount of distance separating the antenna conductor, the first strap conductor and the second conductor.

In some embodiments, an area of the second conductor is larger than an area of the pair of strap pads. In other embodiments, an area of the second conductor is smaller than an area of the at least one pair of strap pads.

In some embodiments, the second conductor is modified via a cutting process. In further embodiments, a shape and an area of the second conductor is modified via a cutting process. In some embodiments, the cutting process is a laser cut line.

In some aspects of the present invention, a radio-frequency identification (RFID) strap device comprises a first strap conductor comprised of a pair of strap pads and an RFID chip connected between the pair of strap pads, a second bridge conductor, and a dielectric positioned between the first strap conductor and the second bridge conductor, wherein the first strap conductor couples to an antenna conductor, and further wherein the second bridge conductor, the first strap conductor, and the antenna conductor overlap each other to provide a mutual area with separating dielectrics and a plurality of capacitors having a value.

In some embodiments, the value of the plurality of capacitors is determined by the (i) mutual area, (ii) a dielectric constant of a material between the antenna conductor, the first strap conductor, and the second bridge conductor, and (iii) an amount of distance separating the antenna conductor, the first strap conductor and the second bridge conductor.

In some embodiments, an area of the bridge conductor is larger than an area of the pair of strap pads. In alternate embodiments, an area of the bridge conductor is smaller than an area of the pair of strap pads. In some embodiments, the second bridge conductor is modified via a cutting process.

The present disclosure also contemplates a method of making shielded straps having an increased capacitance across a RFID device, comprising providing a bridge conductor, a pair of strap pads, and an antenna conductor, attaching the antenna conductor to the pair of strap pads, and attaching the bridge conductor to the pair of strap pads.

In some embodiments, a method of making shielded straps having an increased capacitance across a RFID device further comprises modifying one or more of a shape and an area of the bridge conductor via a cutting process. In some embodiments, the cutting process is performed before attaching the antenna conductor to the pair of strap pads. In other embodiments, the cutting process is performed after attaching the antenna conductor to the pair of strap pads.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1A:
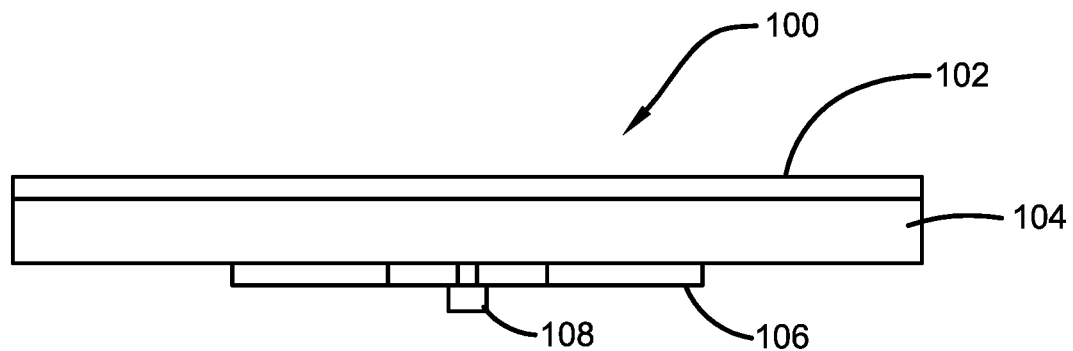
FIG. 1A illustrates a side perspective view of a RFID strap device with a second conductor added to the opposite side of the strap dielectric in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a method of using shielded straps with RFID tag designs. Specifically, the RFID strap device comprises a bridge conductor which couples the antenna and at least one pair of pads (also referred to herein as strap pads or strap conductors) together. Thus, the coupling between the bridge conductor and the strap conductor, the coupling between the bridge conductor and the antenna conductor, and the coupling between the antenna conductor and the strap conductor increases the total capacitance of the RFID strap device.

The amount the capacitance increases depends on one or more of (i) the overlap area between (a) the bridge conductor and the strap conductor, (b) the bridge conductor and the antenna conductor, and (c) the antenna conductor and the strap conductor; the dielectric constant and thickness of intervening materials between each of the strap conductor, the bridge conductor, and the antenna conductor. In most applications an increase of up to 4 times the capacitance of the chip attached to a strap without a shield would be desirable, as higher values would make design of a broadband antenna for an RFID tag coupled to the strap difficult. For example, a typical strap used for a UHF RFID tag may have a capacitance in the region of 1 pF, therefore a shielded strap would have a range of capacitance between 1 pF and 4 pF.

The increased capacitance provided by the presence of the bridge conductor can have a number of beneficial effects on the design of the RFID tag it is used with. For example, having an increased strap capacitance reduces the required inductance to achieve resonance, as discussed further herein.

It is common for a UHF RFID tag to include an inductive element as part of the antenna connected across the strap, the inductive element intended to resonate at a given frequency, for example, the intended operating frequency of the RFID tag. This inductor is generally made as a planar loop of a given width of conductor and area. Because having an increased strap capacitance, which can be achieved by use of a bridge conductor, reduces the required inductance to achieve resonance, a designer can make a loop having a smaller area, and hence occupy less of the total area available for the rest of the antenna structure, thus allowing increased performance to be achieved. Alternatively, use of a loop having a smaller area can allow the use of a wider conductor. A wider conductor can have a number of benefits; for example: the resistance is lower, and hence less energy is lost when a current flows through it at the operating frequency; a different fabrication method can be used, for example, an etching process is required to define a 0.2 mm line, whereas a cutting process may be used for a 1 mm line, a cutting process advantageously being lower cost than an etching process.

Figure 1B:
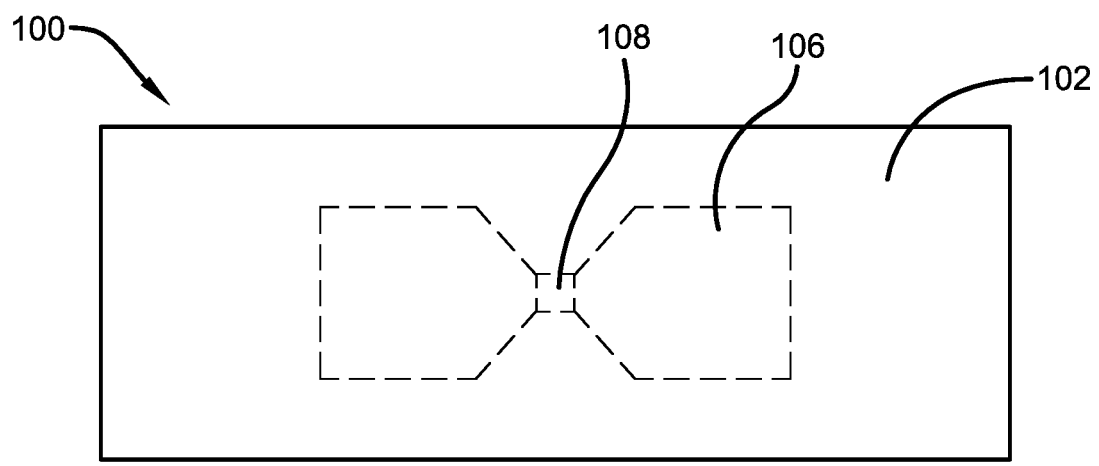
FIG. 1B illustrates a top perspective view of the RFID strap device with the second conductor added to the opposite side of the strap dielectric in accordance with the disclosed architecture.

Referring initially to the drawings, FIGS. 1A-B illustrate an RFID device 100 that incorporates at least a second conductor 102. The second conductor may be, for instance, but is not limited to, a bridge or shield conductor. While the present disclosure discusses the utilization of a second conductor 102, the present disclosure further contemplates the utilization of any number of additional conductors and is not limited to a specific amount. Specifically, the RFID device 100 comprises a first conductor, which is at least one pair of conductor pads 106 and a second conductor 102 (also referred to as a bridge or shield conductor) with a dielectric 104 positioned between the second conductor 102 and the at least one pair of conductor pads 106. In some embodiments, the first conductor can be a strap.

The second conductor 102 can be any suitable conductor as is known in the art, such as, but not limited to, an aluminum foil, a copper foil or a printed conductive ink. Further, the second conductor 102 can be any suitable size, shape, and configuration as is known in the art without affecting the overall concept of the invention. One of ordinary skill in the art will appreciate that the shape and size of the second conductor 102 as shown in FIGS. 1A-B is for illustrative purposes only and many other shapes and sizes of the second conductor 102 are well within the scope of the present disclosure. Although dimensions of the second conductor 102 (i.e., length, width, and height) are important design parameters for good performance, the second conductor 102 may be any shape or size that ensures optimal performance during use.

The RFID device 100 further comprises an RFID chip 108 that is preferably positioned between the conductor pads 106, and is mounted on a suitable carrier (shown in FIG. 2), such as a plastic, paper, fabric, corrugated cardstock, foam or any other suitable material. The second conductor 102 is then added to the other or opposite side of the strap dielectric 104 from conductive pads 106 and RFID chip 108, coupling to the pair of conductor pads 106 and potentially to a separate antenna conductor.

Figure 2:
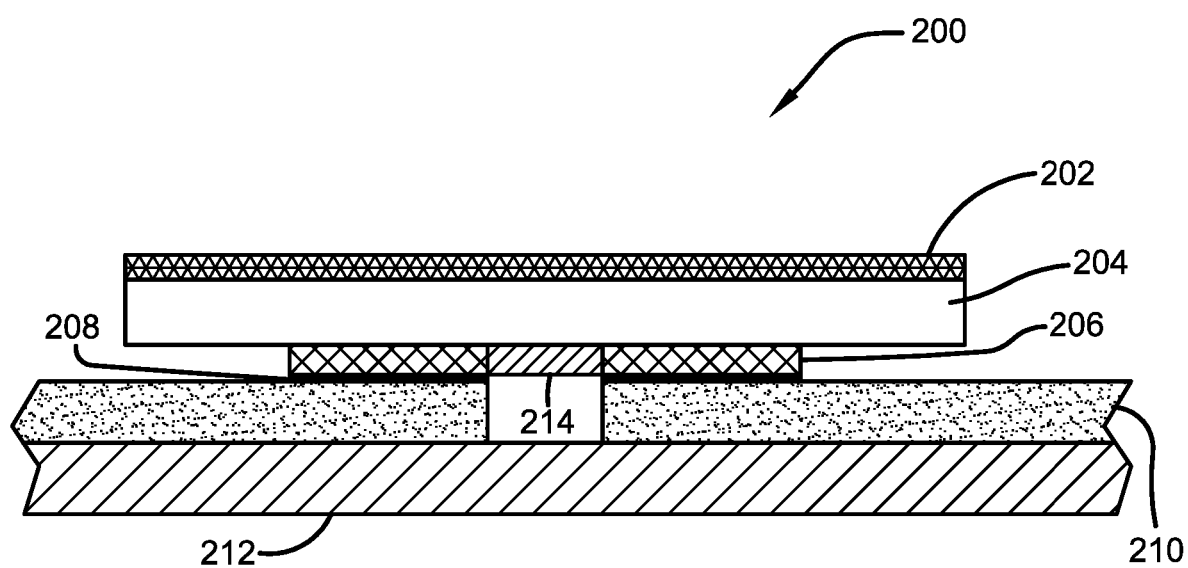
FIG. 2 illustrates a side perspective view of the RFID strap device with added bridge conductor connected to an RFID antenna in accordance with the disclosed architecture.
Figure 3:
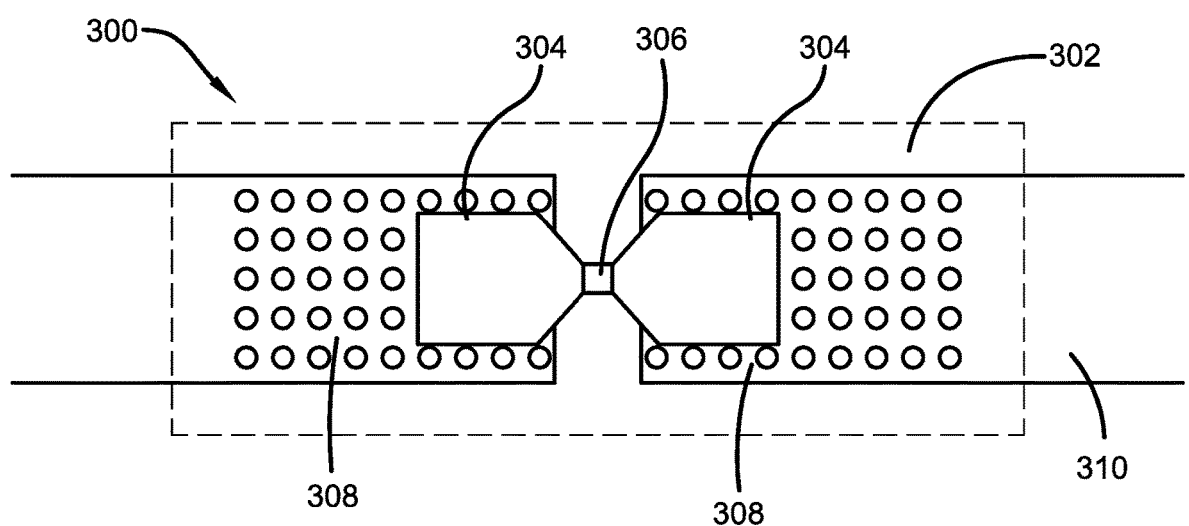
FIG. 3 illustrates a top perspective view of the RFID strap device with multiple conductive layers, the bridge layer, the strap pads, and the antenna conductor in accordance with the disclosed architecture.

As shown in FIG. 2, the RFID device 200 comprises a bridge conductor 202 (also referred to as a second or shield conductor) connected to, or in communication with, an antenna conductor 210. Specifically, the bridge conductor 202 is coupled to a conductor such as a strap conductor 206 and comprises a dielectric 204 positioned between the bridge conductor 202 and the strap conductor 206. The strap conductor 206 further comprises at least one pair of strap pads 208 with an RFID chip 214 positioned between the strap pads 208. The strap pads 208 may then be attached to the antenna conductor 210 via any suitable method as is known in the art, such as the application of a conductive adhesive or non-conductive adhesive (not shown). When attached to the antenna conductor 210 by a conductive adhesive, the strap pads 208 may be coupled to the antenna conductor via the conductive adhesive. In other embodiments, the coupling between the antenna conductor 210 and the strap pads 208 is via capacitance or any other suitable method of coupling as is known in the art, such as magnetic coupling. For instance, a magnetic loop can couple to an antenna, such as antenna conductor 210, when it is adjacent to it. Additionally, the antenna conductor 210 can be made of any suitable material that is known in the art, such as, but not limited to, aluminum foil, copper foil, or printed conductive ink. The antenna conductor 210 can then be attached to an antenna base layer 212 to complete the RFID strap device 200. In another embodiment shown in FIG. 3, an RFID device 300 utilizing a strap comprises at least three conductive layers: a bridge layer 302; a pair of strap pads 304, to which RFID chip 306 is attached; and an antenna conductor 310. While FIG. 3 illustrates the utilization of three conductive layers, the present invention is not limited to any number of conductive layers. These three conductive layers (302, 304, and 310) overlap each other to provide a given mutual area 308 with separating dielectrics, thus creating capacitors. The value of each capacitor is determined, at least in part, by the mutual area 308, separating distance, and dielectric constant of the material between each conductive layer (302, 304, and 310). Additionally, there are small fringing capacitors created on the RFID device 300, but generally these are smaller than the overlap capacitances created by the conductive layers (302, 304, and 310).

Figure 4:
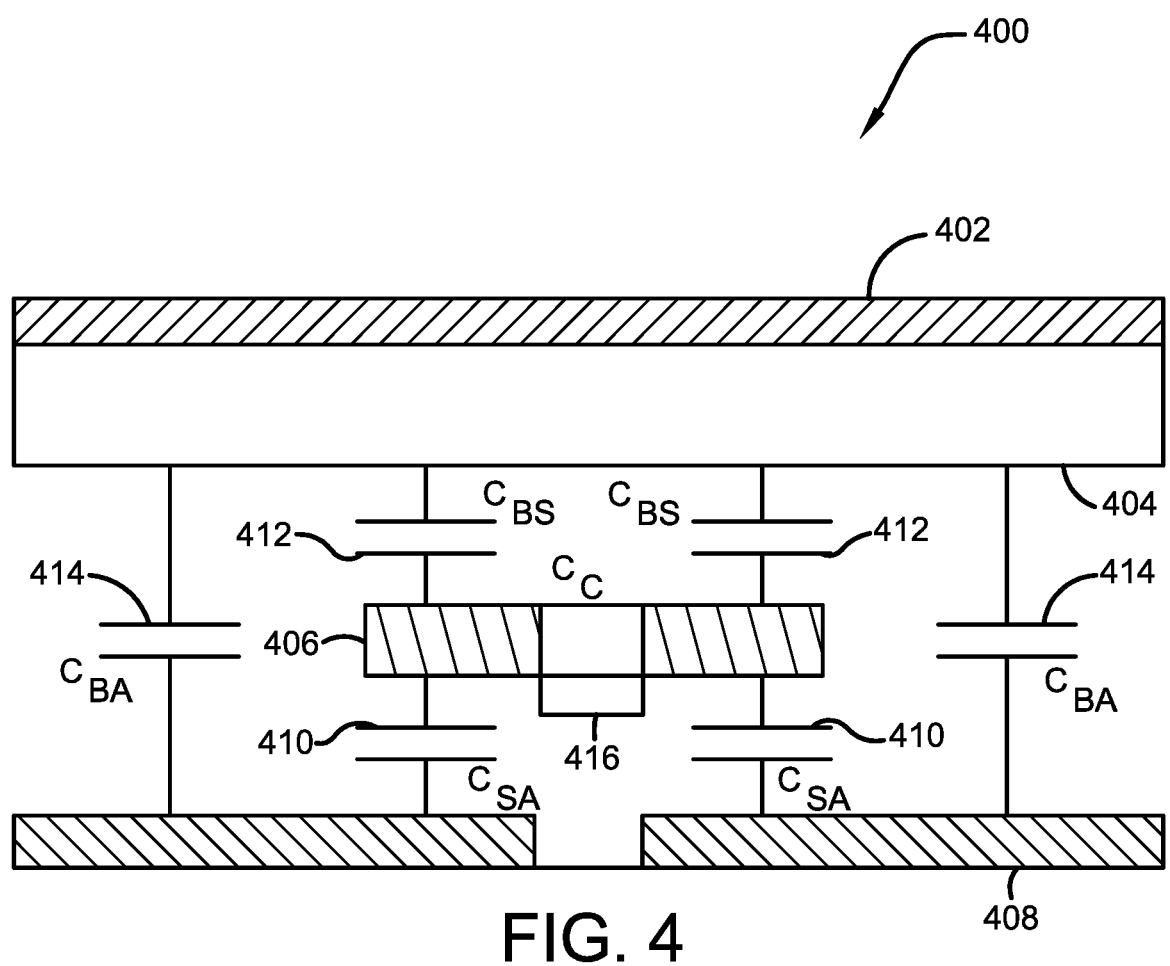
FIG. 4 illustrates a side perspective view of the RFID strap device showing coupling between the strap, antenna, and bridge conductors in accordance with the disclosed architecture.

Additionally, FIG. 4 discloses a RFID device 400 and the coupling between a strap conductor 406, an antenna conductor 408, and a bridge conductor 402. As disclosed, the coupling is not via the conducting dielectric 404, but rather via capacitance. $C_{SA}$ represents the coupling 410 between the strap conductor 406 (i.e., strap pads) and the antenna conductor 408. In one embodiment, a thin dielectric adhesive is used for this joint, making this capacitance large. $C_{BS}$ represents the coupling 412 between the bridge conductor 402 and the strap conductor 406, and $C_{BA}$ represents the coupling 414 between the bridge conductor 402 and the antenna conductor 408. $C_C$ is the capacitance of the RFID chip 416. Generally, and considering that $C_{SA}$ is relatively large in comparison to the other capacitances, $C_{BS}$ and $C_{BA}$ are effectively in parallel; therefore, the capacitance added in parallel across $C_C$ can be expressed by the following formula: $(1/C_B)=2((C_{BA}+C_{BS}))$, where $C_B$ is the total capacitance added by the presence of the bridge conductor 402, and the capacitance presented to the antenna conductor 408 and an inductor structure as part of the resonating element is increased to $C_C+C_B$. Alternatively, the joint may be conductive by using an isotropic conductive paste, an anisotropic conductive paste, thermal, laser or ultrasonic welding, crimping or other methods.

Figure 5A:
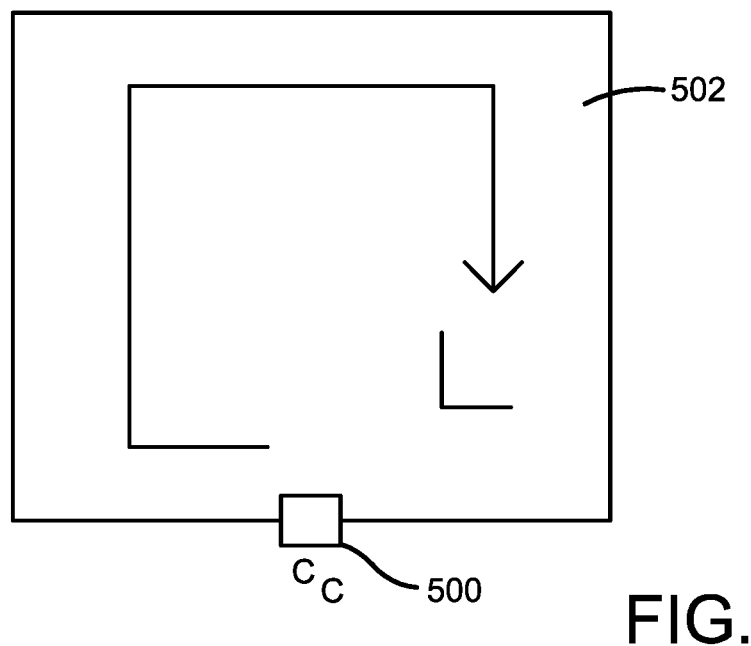
FIG. 5A illustrates a top perspective view of the RFID strap device showing loop inductor in accordance with the disclosed architecture.
Figure 5B:
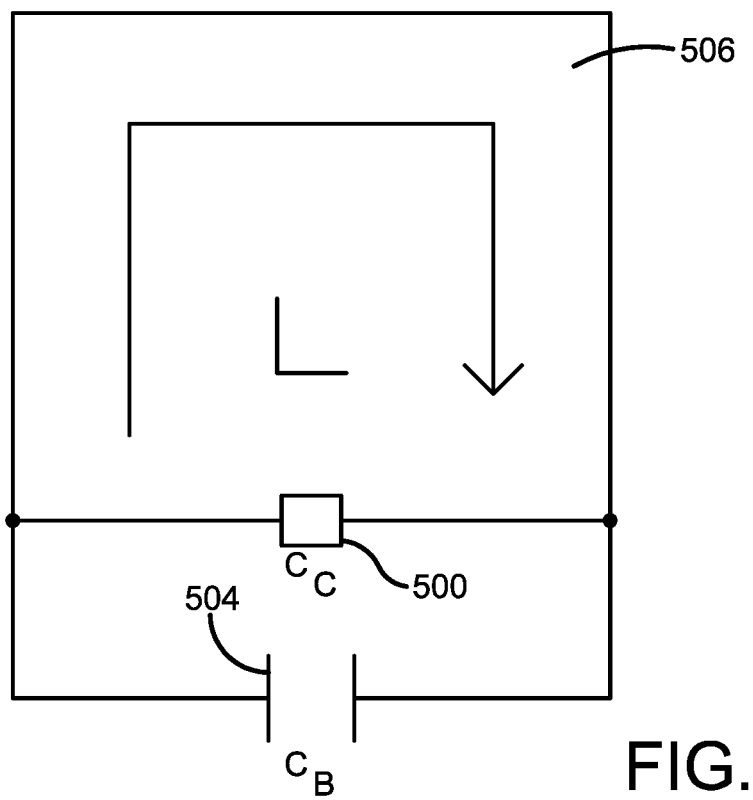
FIG. 5B illustrates a top perspective view of the RFID strap device with bridge strap which reduces the size of the loop inductor in accordance with the disclosed architecture.

FIG. 5A discloses one aspect of the invention of the present disclosure, specifically, a loop inductor 502 with a standard strap. The loop inductor 502 is shown at the typical inductor size to provide the desired resonant frequency, with $C_C$ being the capacitance of the RFID chip 500. In contrast, FIG. 5B discloses a loop inductor 506 with a bridge conductor, and thus having a higher capacitance. For example, in one embodiment, the capacitance of the loop inductor is in the region of 1 pf to 4 pF at UHF frequencies. Because the bridge conductor increases the capacitance of the loop inductor, it also advantageously reduces the inductor size needed to provide the desired resonant frequency, with $C_C$ being the capacitance of the RFID chip 500 and $C_B$ being the total capacitance 504 added by the presence of the bridge conductor. Thus, the area occupied for a given inductance, assuming that the line width is unchanged, is reduced by the presence of the bridge conductor and the higher effective capacitance given when the bridge conductor is connected to the antenna.

Figure 6A:
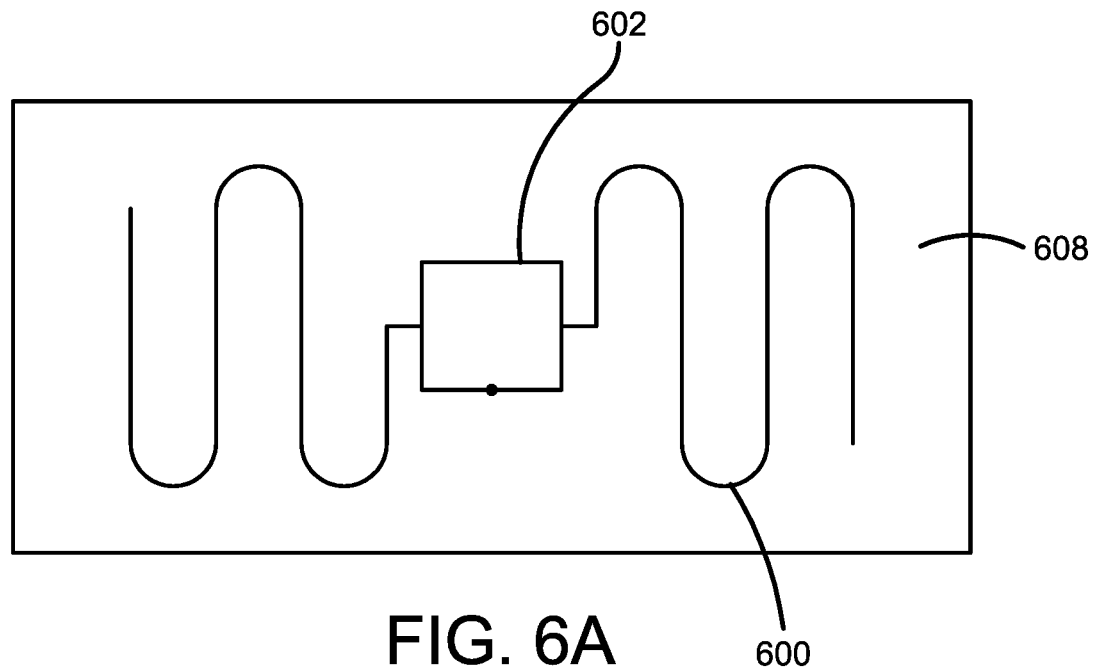
FIG. 6A illustrates a top perspective view of the RFID strap device showing the folded dipole length with standard strap in accordance with the disclosed architecture.
Figure 6B:
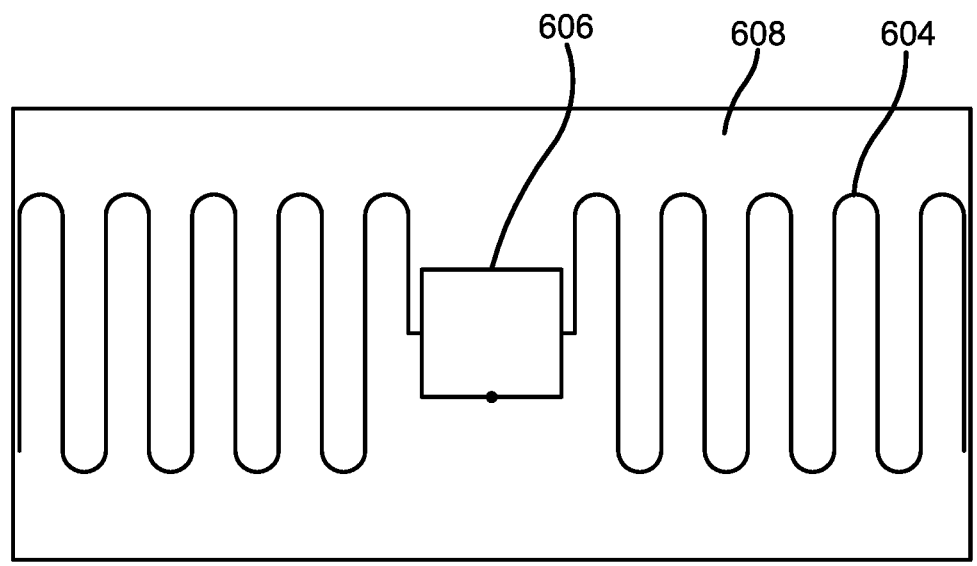
FIG. 6B illustrates a top perspective view of the RFID strap device with bridge strap which increases the folded dipole length in accordance with the disclosed architecture.

As shown in FIG. 6A, a loop area or central matching resonator 602 without a bridge conductor is shown. Specifically, the folded dipole length 600 is shown within the given area 608 with the standard strap. FIG. 6B discloses a loop area or central matching resonator 606 with a bridge conductor. Specifically, the folded dipole length 604 is shown within the given area 608 with the bridge conductor. Thus, the benefit of using the bridge conductor on an antenna that is required to fit inside a given area 608 is shown with an increase in folded dipole length 604. Specifically, for dipole antennas, the efficiency and performance and ease of matching the RFID chip, the antenna is related to how much dipole length can fit into a given area 608. In FIG. 6A, therefore, without the bridge conductor, the central matching resonator 602 occupies a relatively large area, so the space available for the folded dipole length 600 is reduced, so less length can be used. For example, in an antenna of 70 mm×14.5 mm using an unbridged strap (i.e., no bridge conductor), the central loop (i.e., inductor) may occupy a 32 mm×8 mm, which is 256 mm²; on the other hand, using a strap with twice the capacitance may require a central loop (i.e., inductor) occupying 16 mm×8 mm, which is 128 mm². As a result, an area of 128 mm² can be used for other elements of the antenna such as the dipole. In FIG. 6B, the size of the central matching resonator 606 is reduced by using a bridge conductor and hence more folded dipole length 604 can be fit in.

Figure 7A:
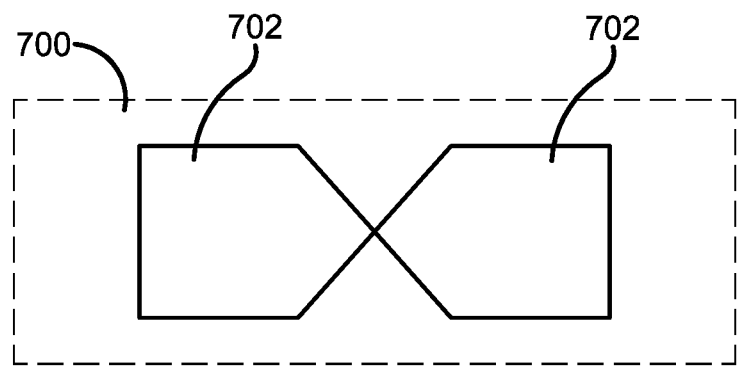
FIG. 7A illustrates a top perspective view of the RFID strap device wherein the shield element is larger than the strap conductors in accordance with the disclosed architecture.
Figure 7B:
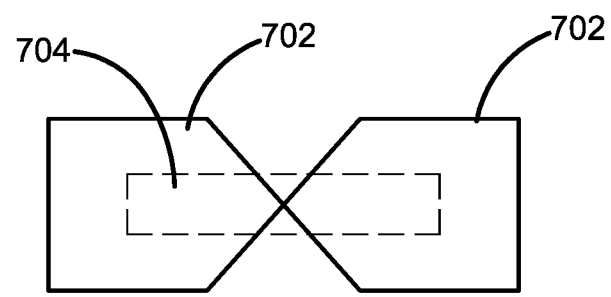
FIG. 7B illustrates a top perspective view of the RFID strap device wherein the shield element is smaller than the strap conductors in accordance with the disclosed architecture.

In an alternative embodiment shown in FIGS. 7A-B, the size and shape of the shield element or bridge conductor 700 and 704 over the top of the strap pads 702 may be varied depending on the wants and/or needs of a user. For example, as shown in FIG. 7A, the area of the bridge conductor 700 is much larger than the area of the strap pads 702, giving high bridging capacitance. In FIG. 7B, in contrast, the size of the bridge conductor 704 has been reduced and is much smaller than the area of the strap pads 702, hence giving lower levels of bridging capacitance. Thus, the bridge conductor can be a variable structure regulating the bridging capacitance based on the wants and/or needs of a user.

Figure 8:
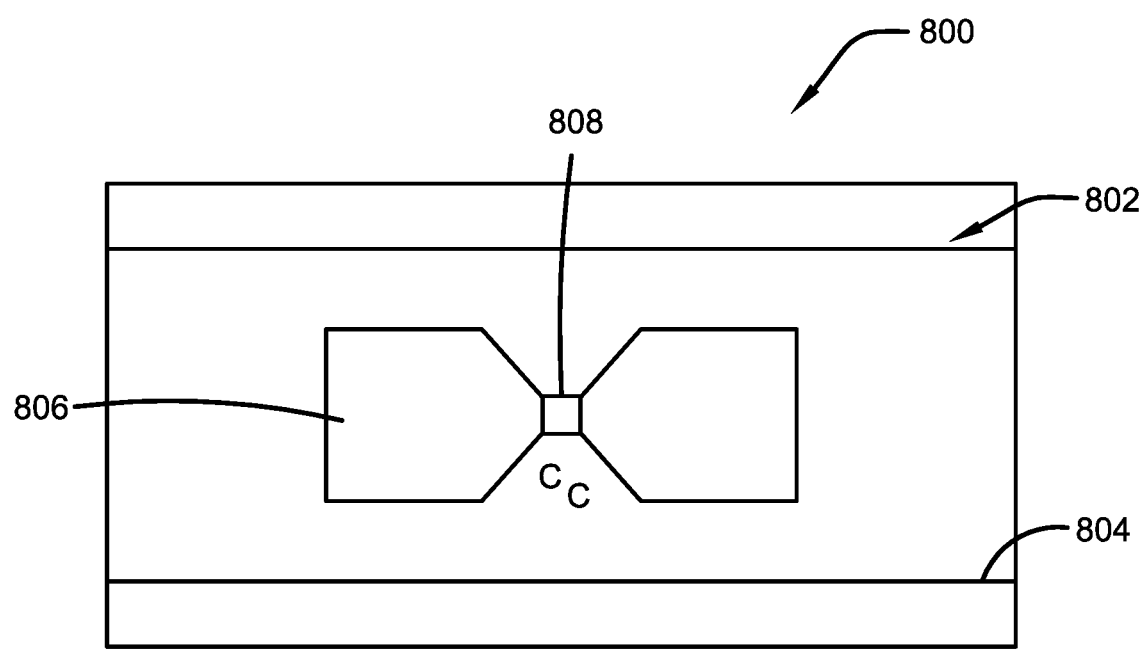
FIG. 8 illustrates a top perspective view of the RFID strap device wherein the bridge conductor is altered via a laser cut line in accordance with the disclosed architecture.

Additionally, as shown in FIG. 8, the RFID device 800 comprises a bridge conductor 802 that can be modified via a cutting process, such as via a laser or mechanical die cutting, to alter the bridging capacitance. Specifically, the cutting process is typically a cut line 804, such as a laser cut line, but can be any suitable cutting process as is known in the art. The cutting process can be performed before or after the pair of strap pads 806 and RFID chip 808 are attached to an antenna (not shown). The cutting process can modify the shape and/or area of the bridge conductor 802 and, therefore, allow the bridging capacitance to be changed. Changing the bridging capacitance allows for tuning of the total RFID chip 808 and bridge capacitance.

This change in capacitance can be used to accommodate manufacturing tolerances or shift the operation frequency of an antenna between two bands. For example, for ultra-high frequency (UHF) tags Europe uses a frequency between 865 MHz and 868 MHz wherein the United States uses a frequency between 902 MHz and 928 MHz. Thus, by using a cutting process to modify the shape and/or area of the bridge conductor 802 to change the bridging capacitance, the same RFID device 800 can be used in two different bands merely by changing the bridging capacitance. Use of the same RFID device 800 having a bridge conductor with a variable bridging capacitance can advantageously reduce manufacturing and operational costs because it allows for the use of one RFID device design in multiple frequency bands.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio-frequency identification (RFID) device comprising:
   a first conductor comprised of at least one pair of strap pads and an RFID chip connected to the at least one pair of strap pads;

a second conductor; and
a dielectric positioned between the first conductor and the second conductor, wherein the first strap conductor couples to an antenna conductor,
wherein the second conductor is a bridge and the second conductor, the first strap conductor, and the antenna conductor overlap each other to provide a mutual area with separating dielectrics and a plurality of capacitors having a value.

2. The RFID device of claim 1, wherein the at least one pair of strap pads is coupled to the antenna conductor via a conductive adhesive.

3. The RFID device of claim 1, wherein the at least one pair of strap pads is coupled to the antenna conductor via capacitance.

4. The RFID device of claim 1, wherein the antenna conductor is attached to a base substrate.

5. The RFID device of claim 1, wherein the value of the plurality of capacitors is determined by (i) the mutual area, (ii) a dielectric constant of a material between the antenna conductor, the first strap conductor and the second conductor, and (iii) an amount of distance separating the antenna conductor, the first strap conductor and the second conductor.

6. The RFID device of claim 1, wherein an area of the second conductor is larger than an area of the pair of strap pads.

7. The RFID device of claim 1, wherein an area of the second conductor is smaller than an area of the at least one pair of strap pads.

8. The RFID device of claim 1, wherein the second conductor is modified via a cutting process.

9. The RFID device of claim 8, wherein the cutting process is a laser cut line.

10. The RFID device of claim 1 wherein a shape and an area of the second conductor is modified via a cutting process.

11. A radio-frequency identification (RFID) strap device comprising:
a first strap conductor comprised of a pair of strap pads and an RFID chip connected between the pair of strap pads;
a second bridge conductor; and
a dielectric positioned between the first strap conductor and the second bridge conductor, wherein the first strap conductor couples to an antenna conductor, and further wherein the second bridge conductor, the first strap conductor, and the antenna conductor overlap each other to provide a mutual area with separating dielectrics and a plurality of capacitors having a value.

12. The RFID strap device of claim 11, wherein the value of the plurality of capacitors is determined by the (i) mutual area, (ii) a dielectric constant of a material between the antenna conductor, the first strap conductor, and the second bridge conductor, and (iii) an amount of distance separating the antenna conductor, the first strap conductor and the second bridge conductor.

13. The RFID strap device of claim 11, wherein an area of the bridge conductor is larger than an area of the pair of strap pads.

14. The RFID strap device of claim 11, wherein an area of the bridge conductor is smaller than an area of the pair of strap pads.

15. The RFID strap device of claim 11, wherein the second bridge conductor is modified via a cutting process.

16. A method of making shielded straps having an increased capacitance across a RFID device comprising:
providing a bridge conductor, a strap conductor comprising at least one pair of strap pads, and an antenna conductor;
attaching the antenna conductor to the strap conductor; and
attaching the bridge conductor to the strap conductor,
wherein the bridge conductor, the strap conductor, and the antenna conductor overlap each other to provide a mutual area with separating dielectrics and a plurality of capacitors having a value.

17. The method of claim 16, further comprising modifying one or more of a shape and an area of the bridge conductor via a cutting process.

18. The method of claim 16, wherein the cutting process is performed before attaching the antenna conductor to the pair of strap pads.

19. The method of claim 16, wherein the cutting process is performed after attaching the antenna conductor to the pair of strap pads.

* * * * *